United States Patent [19]

Gill

[11] Patent Number: 4,974,956

[45] Date of Patent: Dec. 4, 1990

[54] EYEGLASS HOLDER

[76] Inventor: Vicki L. Gill, 5022 Syndt Rd., Evergreen, Colo. 80439

[21] Appl. No.: 351,526

[22] Filed: May 15, 1989

[51] Int. Cl.⁵ .............................................. G02C 3/00
[52] U.S. Cl. .................................. 351/156; 551/157; 24/3 C
[58] Field of Search ................... 351/156, 157, 158; 24/3 C, 122.3; 2/14

[56] References Cited

U.S. PATENT DOCUMENTS

| | | | |
|---|---|---|---|
| 2,184,425 | 12/1939 | Kimball | 2/14 |
| 2,648,255 | 8/1953 | Pendleton | 88/51 |
| 2,660,092 | 11/1953 | Bloom | 88/51 |
| 2,704,961 | 3/1955 | Weil | 88/51 |
| 3,397,026 | 8/1968 | Spina | 351/157 |
| 3,450,467 | 6/1969 | Phillips | 351/157 |
| 3,588,960 | 6/1971 | McClellan et al. | 24/3 |
| 3,728,012 | 4/1973 | Downey | 351/157 |
| 4,133,064 | 1/1979 | Fuller | 351/123 |
| 4,479,703 | 10/1984 | Enghofer | 351/123 |
| 4,541,696 | 9/1985 | Winger et al. | 351/123 |
| 4,696,556 | 9/1987 | Perry | 351/157 |
| 4,783,164 | 11/1988 | Heiberger | 351/156 |
| 4,818,094 | 4/1989 | Lyons | 351/157 |

FOREIGN PATENT DOCUMENTS

WO87/07734 12/1987 PCT Int'l Appl. .

Primary Examiner—Paul M. Dzierzynski
Attorney, Agent, or Firm—John E. Reilly

[57] ABSTRACT

An article holder for eyeglasses in which an elongated cord has opposite end portions and means for releasably connecting a cord to each temple bar of a pair of eyeglasses with the cord extending around the head or neck of the wearer. A sleeve is disposed in outer surrounding relation to the cord, the sleeve of a length to cover substantially the entire length of the cord and slidable with respect thereto. Adjusting means are engagable with an intermediate portion of the cord to extend through the sleeve for adjusting the effective length of the cord between a position fitting snugly around the head of the wearer and a position wherein the eyeglasses are loosely suspended from the neck of the wearer. Preferably the cord is composed of elastic material capable of stretching in a lengthwise direction and the sleeve is capable of undergoing expansion and contraction according to adjustments in the effective length of the cord.

12 Claims, 2 Drawing Sheets

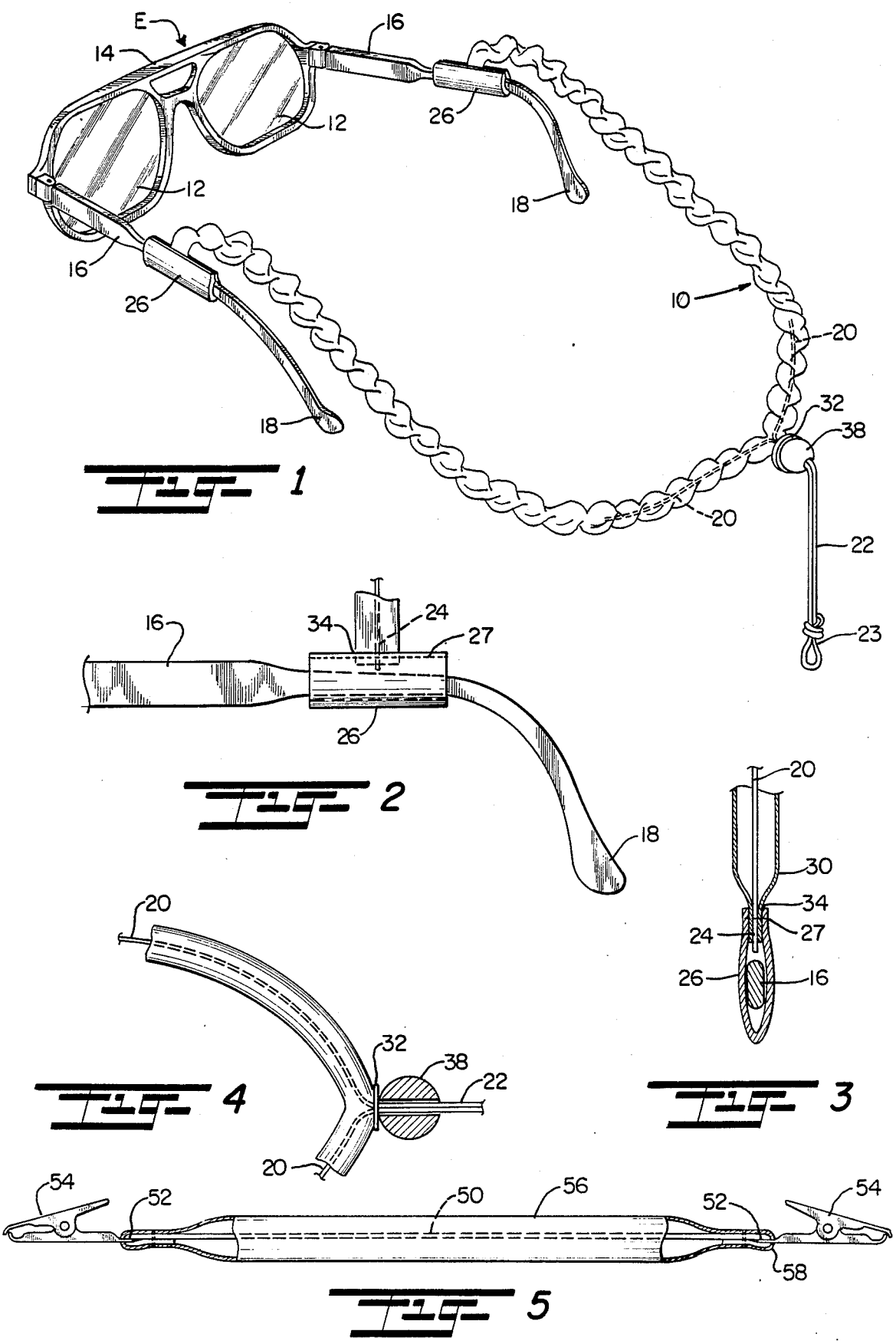

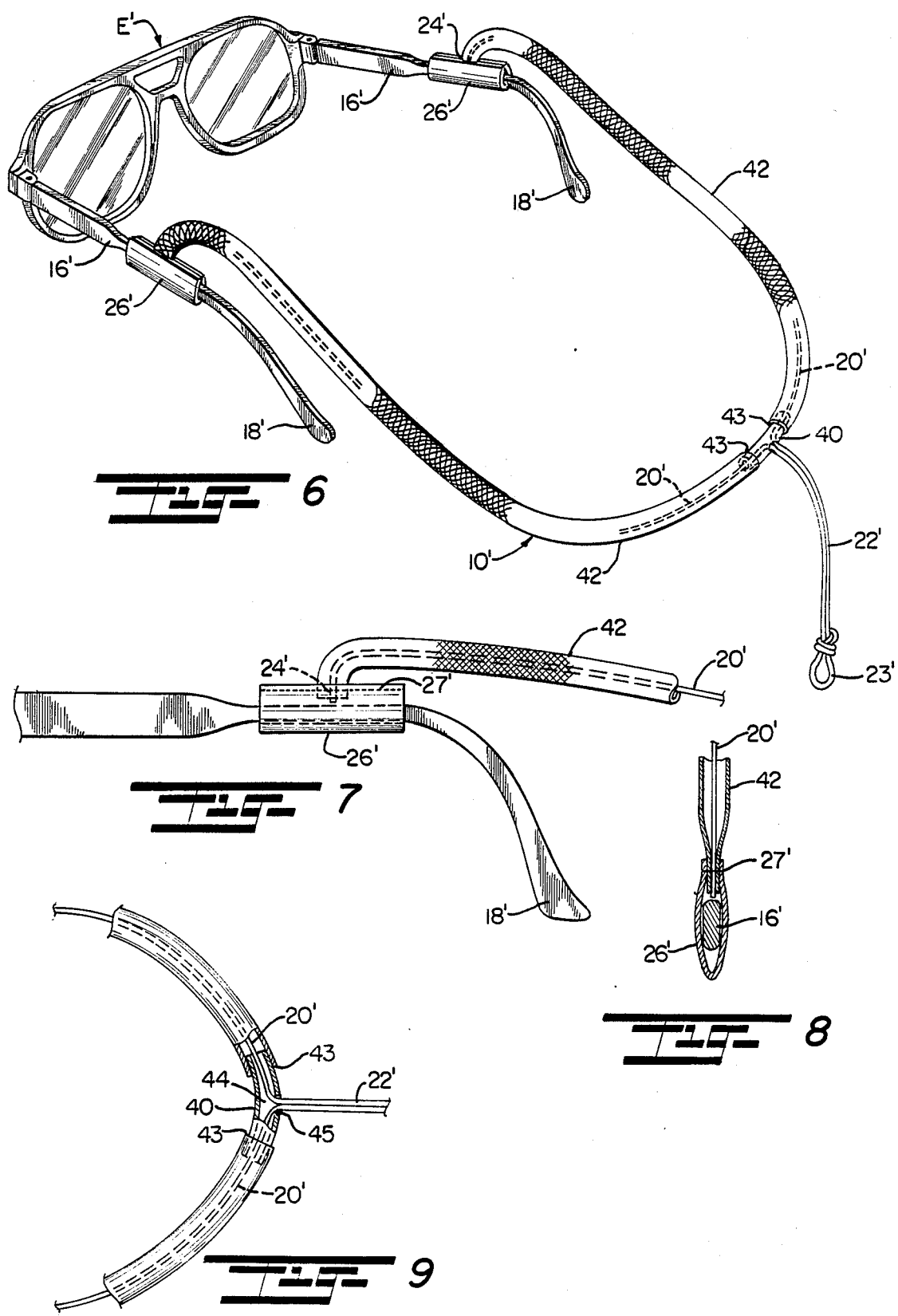

EYEGLASS HOLDER

This invention relates to article holders; and more particularly relates to a novel and improved holder and retainer which is specifically adaptable for releasably securing articles together, such as, the temple bars of a pair of eyeglasses, or items of apparel, such as, socks, gloves and the like when not in use.

BACKGROUND AND FIELD OF THE INVENTION

Article holders have been devised in the past which are characterized by releasably securing items together, for example, to prevent their loss when not in use or to facilitate suspension of the articles from one's person.

The present invention may be best typified by describing its use in connection with eyeglasses, although by no means is the article holder of the present invention limited to that particular application. In the past, eyeglass retainers have been devised which include an elastic or non-elastic cord attached at opposite ends to the temples of the eyeglass frame and with some form of adjusting member or bead to tighten the cord behind one's head. Representative patents are U.S. Pat. Nos. 2,648,255 to E. E. Pendleton, 3,397,026 to J. Spina, 4,783,164 to R. A. Heiberger, 3,450,467 to J. C. Phillips, 3,588,060 to B. McClellan et al and 3,728,012 from D. P. Downey. Also, it has been proposed to use some form of a tubular band with ends which can be stretched over the ends of the temples, such as, disclosed in U.S. Pat. Nos. 2,660,092 to I. E. Bloom and 4,696,556 to C. D. Perry, III and PCT WO87/077434 to C. Giles et al. Another approach has been to employ a chain with ends of the chain fitting into a common sleeve or sheath and a coil spring within the sheath takes up any slack when the chain is passed over the head.

Among the features of the present invention is to overcome any problems of adjustment of the connecting member or cord, such as, to avoid tangling of the hair but at the same time lend a generally more pleasing decorative effect and a secure means of attachment to the temples of a pair of eyeglasses while maintaining simplicity of construction.

SUMMARY OF THE INVENTION

Accordingly, it is an object of the present invention to provide for a novel and improved article holder, specifically one that is capable of releasably securing small articles together, such as, items of apparel; or in retaining a pair of eyeglasses in place, for example, in playing sports or other recreational activities.

Another object of the present invention is to provide for a novel and improved eyeglass retainer which is conformable for use in fitting snugly around the head to hold the glasses in place; or, when the glasses are not in use, can be lowered to suspend the glasses from the neck.

Another object of the present invention is to provide for a novel and improved eyeglass retainer band which is readily conformable for releasable connection to various styles and designs of eyeglasses and/or goggles for the purpose of retention on the head of the wearer as well as to permit suspension from the neck when not in use.

It is a further object of the present invention to provide for a novel and improved eyeglass retainer which affords ease of adjustment without tangling the hair, facilitates the use of different decorative retainers which can more readily blend in with clothing; and further wherein a novel and improved means of attachment is provided for releasably securing opposite ends of the retainer to the temples of a pair of eyeglasses so as to minimize slipping or accidental displacement from the temples when in use.

It is an additional object of the present invention to provide for an article holder in the form of an eyeglass retainer which includes a protective, decorative outer sleeve independently slidable with respect to a retention cord in securing a pair of eyeglasses in place either around the neck of a wearer or to snugly retain the eyeglasses in position over the eyes.

In accordance with the present invention, a preferred form or article holder has been devised for eyeglasses in which an elongated cord has opposite end portions and means at said end portions for releasably connecting said cord to each temple bar of a pair of eyeglasses with the cord extending around the head or neck of a wearer, and a sleeve is disposed in outer surrounding relation to the cord, the sleeve being of a length to cover substantially the entire length of the cord and slidable with respect to the cord, and adjusting means are engagable with an intermediate portion of the cord which extends through the sleeve for adjusting the effective length of the cord between a position fitting snugly around the head of the wearer and a position in which the eyeglasses are loosely suspended from the neck of the wearer. Preferably the cord is of elastic material capable of stretching in a lengthwise direction and the sleeve is capable of undergoing expansion and contraction according to adjustments in the effective length of the cord. In a modified form of eyeglass retainer, the adjusting means takes the form of a tubular member through which the intermediate portion(s) of the cord will protrude, and the sleeve is divided into two sections on either side of the tube and will undergo expansion or contraction when the effective length of the cord is adjusted by moving through the tube, the tube being a very flexible rubber or rubber-like member which will frictionally engage the cord. In still another modified form of invention, the article holder has a single length of a cord surrounded by an outer protective flexible sleeve which is of a length to be coextensive with the cord, and connecting elements such as alligator clips are provided at opposite ends of the cord and sleeve for releasable connection to a pair of articles, such as, gloves or mittens.

The above and other objects of the present invention will become more readily appreciated and understood from a consideration of the following detailed description of a preferred embodiment when taken together with the accompanying drawings wherein

BRIEF DESCRIPTION OF THE DRAWINGS

FIG. 1 is a perspective view of a preferred form of eyeglass retainer in accordance with the present invention in assembled relation to a pair of eyeglasses;

FIG. 2 is a side fragmentary view of one of the temples of a pair of eyeglasses and illustrating the releasable connecting member forming a part of the preferred form of eyeglass retainer shown in FIG. 1;

FIG. 3 is a cross-sectional view of the releasable connecting member shown in FIG. 2;

FIG. 4 is a top plan view illustrating adjustment means for the retainer of FIG. 1;

FIG. 5 is a view partially in section of another modified form of invention intended more for releasably securing together articles of clothing to prevent their accidental loss;

FIG. 6 is a perspective view of a modified form of eyeglass retainer in accordance with the present invention;

FIG. 7 is a side view illustrating the interconnection of the retainer to one of the temples of a pair of eyeglasses;

FIG. 8 is a cross-sectional view of the connecting member shown in FIG. 2; and

FIG. 9 is a view partially in section of an adjusting member forming a part of the eyeglass retainer of FIG. 5.

DETAILED DESCRIPTION OF THE PREFERRED EMBODIMENT

Referring in more detail to FIGS. 1 to 4, an article holder 10 is illustrated by way of illustrative example in connected relation to a pair of eyeglasses E. Specifically, in this setting, the eyeglasses are comprised of a pair of lenses 12 in a common frame 14, and a pair of temple bars 16 are hinged to opposite sides of the frame 14 for rearward extension over the ears of the wearer and terminating in downwardly curved ear pieces 18. Again, the eyeglasses are merely illustrative of a typical application for the article holder 10 and, in particular, to serve the function of releasably connecting a pair of articles together. Moreover, the eyeglasses E as shown are merely representative of a typical eyeglass construction and it will become apparent that the article holder is readily conformable for use with virtually any style or design of eyeglasses or goggles.

When employed as an eyeglass retainer, the article holder of the present invention is so constructed and arranged as to facilitate snug-fitting placement or engagement of the eyeglasses on the head of the wearer and to be readily adjustable to fit different head sizes. When it is desired to remove the glasses, they can be comfortably lowered into a position in which the article holder 10 serves to loosely suspend the glasses from the neck of the wearer. To this end, the preferred form of article holder comprises an elongated elastic cord 20 which is doubled upon itself at an intermediate portion 22 and preferably is knotted as at 23. The cord terminates in opposite free ends 24 and, as best seen from FIGS. 2 and 3, each free end 24 is permanently attached to a releasable connecting member 26 for releasable connection to each of the temples 16. Preferably, each member 26 is of generally tubular configuration and is given some flexibility and elasticity to facilitate slight expansion over the curved ear piece 18 as well as to permit lengthwise stretching. Nevertheless, it is not necessary that the member 26 tightly or snugly engage the temple 16, since the connection of the end portion 24 at an intermediate portion, when tightened, will apply sufficient pressure on the member 26 to cause it to frictionally engage the temple and discourage it from slipping off of the temple. For this reason, the connecting member 26 can be of limited length with respect to the length of the temple and yet afford the necessary non-slipping engagement without necessity of the tubular member tightly fitting the temple.

Another important feature of the present invention resides in the use of an outer protective sleeve 30 in outer spaced concentric relation to the cord 20. Preferably, the sleeve 30 is one continuous length which includes an intermediate opening provided with a reinforcing edge or grommet 32 through which the intermediate portion 22 of the cord extends, and opposite end portions of the sleeve 34 are permanently affixed to the connecting member 26 in surrounding relation to the end 24 of the cord 20. Accordingly, both the cord ends 24 and sleeve ends 34 are permanently attached to the connecting member 26 by sewing together at an intermediate portion of the seam 26' of the connecting member 26. Preferably, the sleeve 30 is composed of a fabric material and which is of a length to expand into a position as shown in FIG. 4 which will conform to the length of the cord 20 when fully stretched but will gather together in gentle folds, for example, as illustrated at 36 in FIG. 1 when the cord is tightened and stretched somewhat around the head of the wearer. In order to adjust the effective length of the cord, the looped or intermediate portion 22 of the cord is inserted through a bore 38 of a bead 39, following which the intermediate portion is knotted as at 23 to prevent accidental removal of the bead from the intermediate portion. In order to tighten or stretch the cord, it is necessary merely to advance the bead along the intermediate portion 22 and against the grommet 32 which surrounds the opening in the sleeve 30.

In the construction of the preferred form of eyeglass retainer 10 as described, the cord is a solid member composed of a rubber-like or composition rubber and fabric material and which for adult sizes has a length on the order of 20 to 34" and a diameter of less than 1/16"; and the cord is capable of stretching to an extended length of 24 to 30". The sleeve 30 is composed of a lightweight cloth or fabric material having a diameter on the order of ¼" and a length corresponding to the extended length of the cord. Both the free ends of the cord 20 and sleeve 30 are permanently attached by sewing into the seam 26' of the connecting member, and the bead 39 is provided with a central bore 38 which is sized to require tight-fitting insertion of the looped sections of the cord so that when the bead is tightened it will prevent accidental loosening of the cord or in other words require positive outward displacement of the bead toward the knotted end in order to loosen the cord. Construction of the sleeve in the manner described and its disposition over the cord lends itself particularly well to use of various different materials or patterns either to match different eyeglass frames or to blend in with various apparel.

It will be appreciated that the particular construction and arrangement of the releasable connecting members 26 may be modified according to the articles to which the holder is to be attached and, for example, various types of clips or clamping devices may be employed to facilitate connection to different articles. A particular advantage of the connecting member described is its ability to be readily placed onto the temple of an eyeglass frame and, by virtue of the connection of the cord 20 to an intermediate portion of the connecting member 26, will exert pressure in a direction tending to discourage slippage of the connecting member with respect to the temple. Yet the connecting member 26 can be readily removed by grasping directly in the hand and withdrawing the temple therefrom.

DESCRIPTION OF MODIFIED FORM OF INVENTION

Referring to FIGS. 6 to 9, a modified form of article holder or eyeglass retainer 10' is shown wherein like parts are correspondingly enumerated with prime numerals to those of the preferred form. In the modified form, the cord 20' has free end portions 24' affixed to a releasable connecting member 26' in the same manner as described with respect to the preferred form. The connecting member 26' is once again a generally tubular member which has a limited amount of elasticity or stretch both in the lengthwise and radial directions. Further, the cord 20' includes an intermediate looped portion 22' with a lengthadjusting member in the form of a tube 40 and a knotted end portion 23'. A feature of the modified form of invention is utilization of a sleeve 42 in outer closely surrounding relation to the cord 20', and the sleeve is composed of a stretchable or extendable material which will permit its contraction or expansion with the cord member 20'. In the modified form as shown, the sleeve 42 is composed of a woven material and is divided into a pair of sleeve sections which terminate in end portions 43 disposed in closely surrounding relation to the tube 40. As seen from FIG. 9, the tube 40 has a central opening 44 along its axis which communicates with a common opening 45 in the wall of the tube. The cord can be inserted through the tube prior to connection of the members 26' or, if desired, the cord 20' can be divided or split in two at the intermediate portion 22 so that each free end can be threaded through the tube and through the central opening 45 and then tied together as 23'. Another suitable expedient would be to split the tube itself and join it together over the cord 20'. The ends 43 of the sleeve 42 are then secured over the opposite ends of the tube 40 and permanently attached to the tube so as to follow the movement of the tube in adjusting the effective length of the cord 20'.

As seen from a comparison of FIG. 9 with FIG. 6, although the sleeve sections 42 are in closely surrounding relation to the cord 20', they can be contracted or reduced in length without becoming gathered or folded together as illustrated in FIGS. 1 to 4. Advantages for certain applications of the eyeglass retainer 10' are that the sleeve can be made of a relatively thick cross-section so as to more widely distribute the pressure exerted by the cord as it is tightened around the head of the wearer. At the same time, the sleeve is compact and permits selection of any of a number of different decorative woven materials. The outer protective sleeve member 42 functions in the same manner as the sleeve 30 of the preferred form in permitting length adjustment of the cord in tightening around the head of the wearer simply by adjustment of the tube 40. Also the glasses can be worn around the neck when not in use simply by loosening the bead and permitting the retainer to pass around the neck of the wearer.

The preferred and modified forms of invention as herein described are particularly suitable for use for one playing sports or engaging in various forms of recreational activity in that the desired degree of tautness can be maintained by simple adjustment of the length-adjusting members 39 or 40. At the same time, the outer protective sleeve can be composed of any of a number of moisture-absorbent materials, such as, a terry cloth material and which will function in the same manner as described with reference to other fabric or woven materials.

Still another modified form of invention is illustrated in FIG. 5 wherein an elongated flexible and elastic cord member 50 has opposite end portions 52 to which are secured releasable connecting members in the form of alligator clips 54. In this form, the cord is once again preferably an elastic material capable of stretching in a lengthwise direction. An outer protective sleeve 56 of fabric or fabric-like material is disposed in loosely surrounding relation to the cord 50, and opposite end portions 58 are attached or joined to the alligator clips 54 in closely surrounding relation to the end portions of the cord 50. Once again, the sleeve 56 is of a length such that it will be contracted somewhat into a series of gathers or folds when the cord 50 is in a relaxed state; however, when the cord 50 is stretched the sleeve 56 will be capable of extending or stretching with the cord. The holder as described in the form of FIG. 5 has particular utility in releasably securing together articles of clothing, such as, socks, gloves or the like when not in use so as to prevent their accidental loss. In this relation, the cord 50 may be made of any desired length and the sleeve 56 can be made of any suitable fabric or fabric-like material including woven materials of the type described with respect to FIGS. 6 to 9.

It is therefore to be understood that the foregoing and other modifications and changes may be made in the construction of preferred and modified forms of the present invention without departing from the spirit and scope as defined by the appended claims and any reasonable equivalents thereof.

I claim:

1. In a retainer for eyeglasses, the combination comprising:
   an elongated flexible cord having opposite end portions and means at said end portions for releasably connecting said cord to each temple bar of a pair of eyeglasses, said cord being of a length to extend around the head or neck of a wearer;
   a flexible sleeve in outer spaced surrounding relation to said cord, said sleeve being of a length to cover substantially the entire length of said cord; and
   adjusting means engageable with an intermediate portion of said cord for adjusting the effective length of said cord between a position fitting snugly around the head of the wearer and a position in which the eyeglasses are loosely suspended form the neck of the wearer.

2. In a retainer according to claim 1, said sleeve including opposite ends attached to said releasable connecting means.

3. In a retainer according to claim 2, said sleeve being of a fabric or fabric-like material and sized for disposition in loosely surrounding relation to said cord.

4. In a retainer according to claim 3, said cord being of an elastic material capable of stretching in a lengthwise direction, and said sleeve undergoing expansion and contraction according to adjustments in the effective length of said cord.

5. In a retainer according to claim 1, said sleeve having an intermediate opening therein through which an intermediate portion of said cord protrudes, and said adjusting means engageable with said intermediate portion of said cord and bearing against said sleeve in surrounding relation to said opening.

6. In a retainer according to claim 1, said releasable connecting means defined by a tubular flexible member sized to extend over each of said temple bars for frictional engagement therewith.

7. In a retainer according to claim 6, said opposite free end portions connected to an intermediate external portion of each of said releasable connecting means, and opposite end portions of said sleeve permanently attached to said releasable connecting means in surrounding relation to said cord.

8. In a retainer for a pair of eyeglasses, the combination comprising:

an elongated flexible elastic cord having opposite end portions, releasable connecting means at said end portions for releasably connecting said cord to each temple bar of a pair of eyeglasses and said cord being of a length to extending around the head or neck of a wearer;

a sleeve in outer surrounding relation to said cord, said sleeve being of a length to cover substantially the entire length of said cord; and adjustable slide means engageable with said cord for adjusting the effective length of said cord between a position to fit snugly around the head of the wearer and a position in which the eyeglasses are loosely suspended from around the neck of the wearer.

9. In a retainer according to claim 8, said sleeve being of a fabric or fabric-like material and sized for disposition in loosely surrounding relation to said cord, said sleeve including opposite ends attached to said releasable connecting means.

10. In a retainer according to claim 8, said cord being of an elastic material capable of stretching in a lengthwise direction, and said sleeve defined by a pair of sleeve sections connected to said adjustable means, said sleeve sections undergoing expansion and contraction according to adjustments in the effective length of said cord.

11. In a retainer according to claim 10, said slide means having an opening through which an intermediate portion of said cord extends, said slide means frictionally engageable with said intermediate portion of said cord for adjusting the effective length of said cord.

12. In a retainer according to claim 11, said releasable connecting means defined by a tubular elastic member sized to extend over each of said temple bars for frictional engagement therewith, said opposite end portions of said cord connected to an intermediate external portion of each of said releasable connecting means, and opposite end portions of said sleeve permanently attached to said releasable connecting means in surrounding relation to said cord.

* * * * *